UNITED STATES PATENT OFFICE.

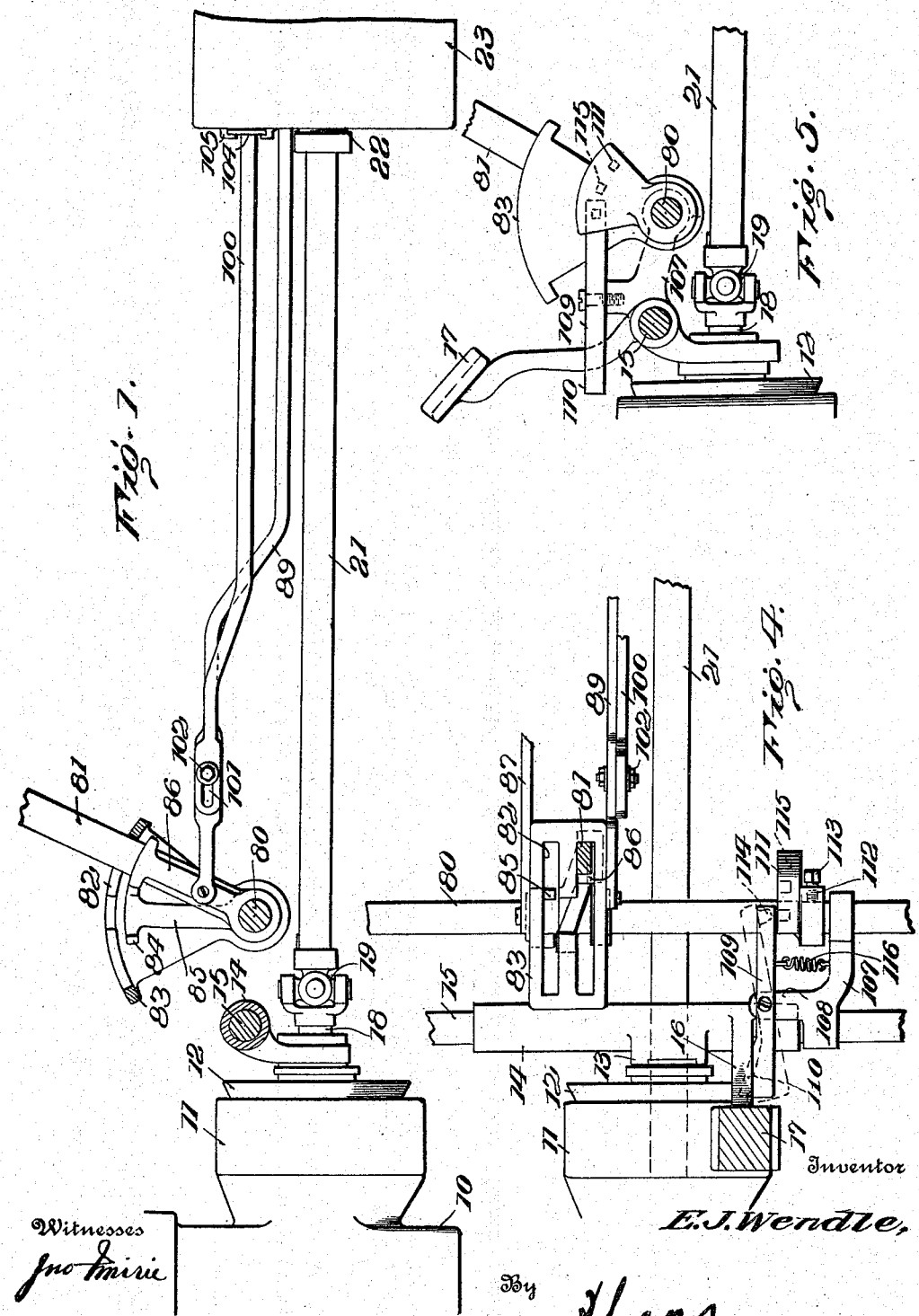

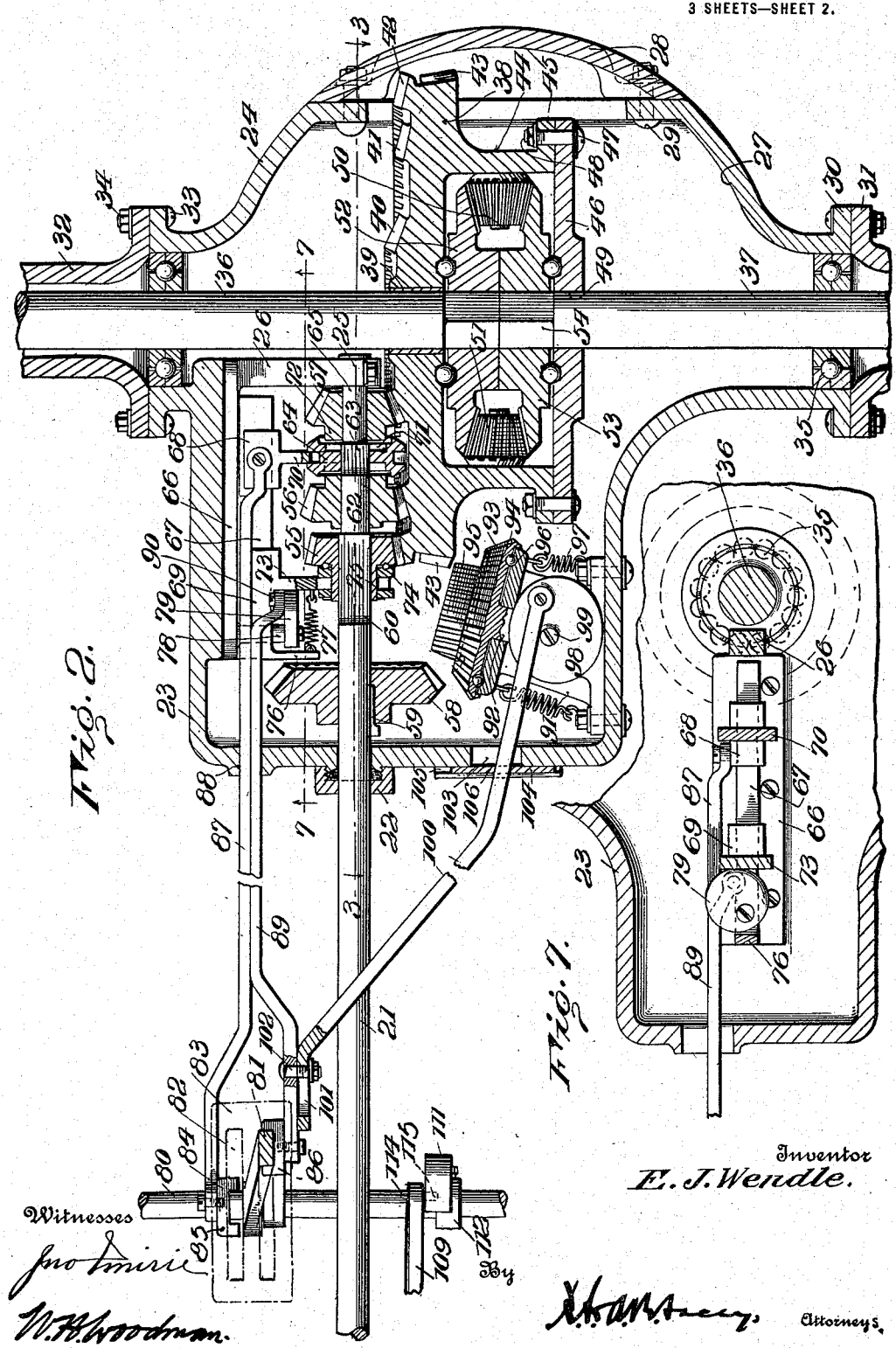

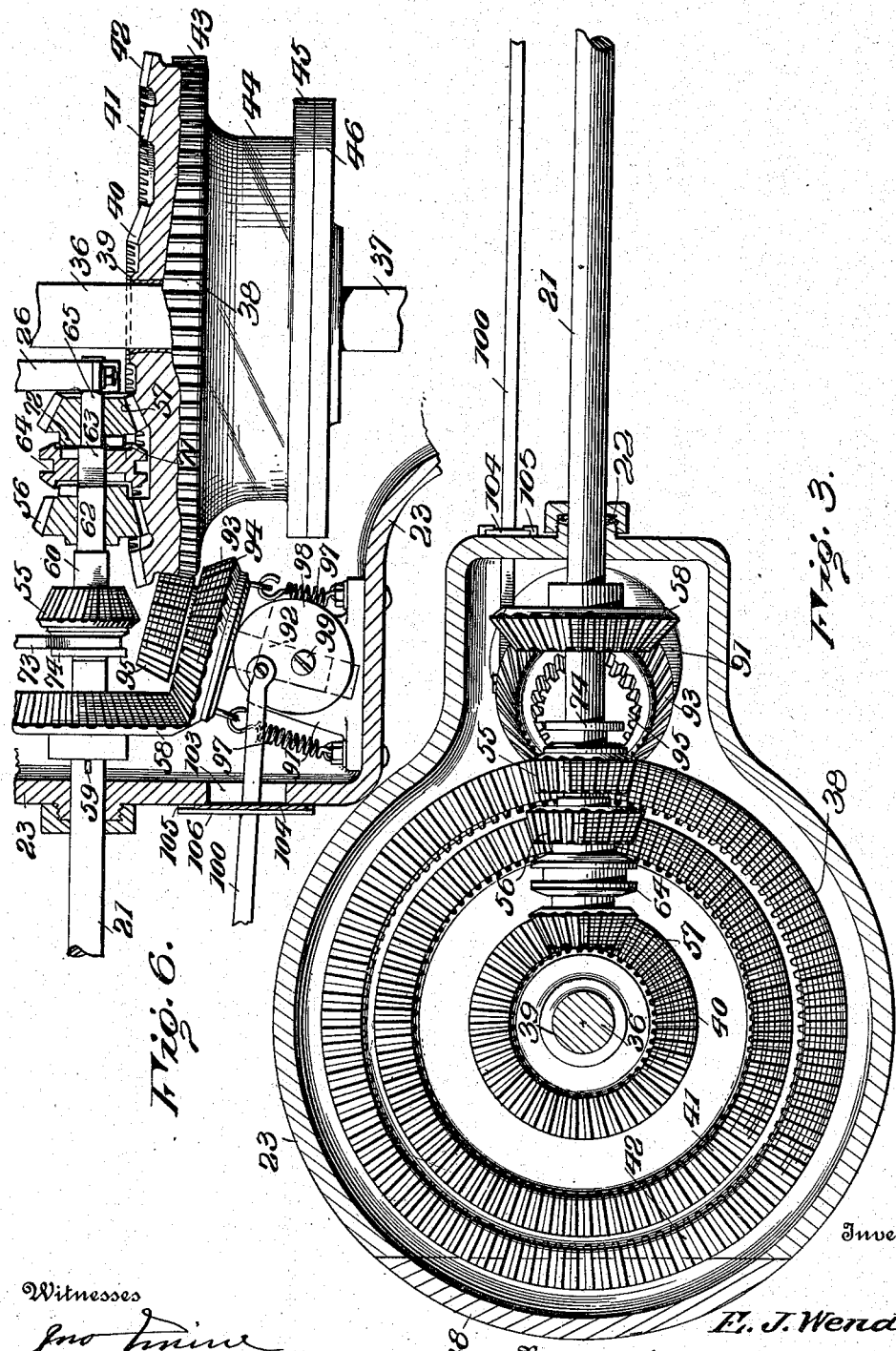

EDGAR J. WENDLE, OF JOHNSTOWN, PENNSYLVANIA.

AUTOMOBILE TRANSMISSION POWER.

1,152,771.  Specification of Letters Patent.  Patented Sept. 7, 1915.

Application filed July 13, 1914. Serial No. 850,761.

*To all whom it may concern:*

Be it known that I, EDGAR J. WENDLE, citizen of the United States, residing at Johnstown, in the county of Cambria and State of Pennsylvania, have invented certain new and useful Improvements in Automobile Transmission Power, of which the following is a specification.

My present invention relates to new and useful improvements in power transmission mechanisms for self-propelled vehicles, the main object of my invention being the provision of a variable speed power transmission mechanism which will be less complicated in construction and operation than those now in use and at the same time more efficient and reliable.

My improved power transmission mechanism is of that general type in which the transmission gearing and differential mechanism are both incorporated in the rear axle housing into which the drive or propeller shaft leads, such shaft being provided with one or more universal joints to compensate for changes in level between the engine and axle.

For this reason, a further object of my invention is the provision of a transmission mechanism in which a single, compound multiple gear replaces all the driven gears, common to transmission mechanisms, thus economizing in space.

In this connection, a still further object of my invention is the provision of a multiple driven gear mounted for free rotation upon one of the live axle sections, but held against longitudinal movement thereof and constructed to directly carry the cage inclosing the differential gearing.

Another object of my invention is to provide a transmission gearing, of the selective speed type, so constructed and arranged that all the speeds for which the gearing is adapted may be obtained by the proper manipulation of a single lever.

A yet further object of my invention is the provision of a lock for the transmission gearing operable by and in conjunction with the clutch and so arranged that the gears are always locked in selective position when the clutch is in active position, this as a result, preventing all changing of the transmission gears while the driving shaft is being driven by the engine.

A still further object of my invention consists in the construction of a transmission gearing in which the drive shaft carries a plurality of loosely mounted beveled gears constantly in engagement with concentrically formed beveled gears carried by the multiple gear of the rear axle, means being provided for selectively locking these gears to the drive shaft, another beveled gear also loosely mounted upon the drive shaft being arranged to be slid into mesh with still another beveled gear cut upon the multiple gear to provide for the low speed power transmission of the mechanism.

A still further object of my invention is the provision of a reverse gear mechanism in which coupled beveled gears are simultaneously moved into mesh, one with a beveled gear carried by the drive shaft and one with a beveled gear cut upon the multiple gear of the rear axle. By providing a gear transmission of the above described character, all stripping of gears is avoided as all gears, save the low speed and reverse gears, are constantly in mesh with the gears which they drive and the low speed and reverse gears are never under load when being brought into mesh with the gears which they drive.

Another object which I have in view in my present invention, consists in so forming the transmission gearing and the control mechanism therefor that the various speed changes may be obtained by the use of a single gear lever operating in an H-plate of conventional construction, in connection with the usual resilient locking arms engaging such lever to secure it in its various positions.

While the above are the chief objects which I have in view, many minor objects, such as the provision of a neat and compact gear construction, the provision of a simple transmission structure including but few parts, and the provision of thrust bearings in connection with the moving gears, will appear during more detailed description of my invention.

With these and other objects in view, my invention will be more fully described, illustrated in the accompanying drawings and then specifically pointed out in the claims which are attached to and form a part of this application.

In the drawings: Figure 1 is a fragmentary side elevational view illustrating the control mechanism of my transmission gearing; Fig. 2 is a horizontal sectional view taken through the transmission housing and certain of the gears contained therein, this view also showing the controlling mechanism in top plan view; Fig. 3 is a fragmentary vertical sectional view taken on the line 3—3 of Fig. 2; Fig. 4 is a fragmentary top plan view of a portion of the controlling mechanism showing the gear shifting lever in the position which it occupies when the gears are in low speed; Fig. 5 is a side elevational view of the structure shown in Fig. 4; Fig. 6 is a fragmentary view corresponding to a portion of Fig. 2 and illustrating the position of the gears for a reverse drive of the mechanism; Fig. 7 is a vertical sectional view on the line 7—7 of Fig. 2, illustrating certain details of control mechanism.

Corresponding and like parts are referred to in the following description and indicated in all the views of the drawings by the same reference characters.

In order to insure a clear and accurate understanding of my invention and its application I have illustrated it in connection with a gas engine 10 of conventional type having a fly wheel 11 which includes a clutch 12, the movable member of this clutch being reciprocated through the medium of a shipper yoke 13 carried by a sleeve 14 journaled upon a supporting shaft 15 carried by the frame of the vehicle, this sleeve being provided with an arm 16 which extends through the floor of the vehicle and carries a foot pedal 17. The shaft section 18, leading from the clutch, is connected by a universal joint 19 of conventional or any preferred type with the drive or propeller shaft 21, the rear end of which extends through a stuffing box 22 formed in the forward end of the transmission housing 23, which housing is connected directly to the rear axle and differential housing, indicated as a whole by the numeral 24. The extreme rear end of the drive shaft 21 is journaled in a cap bearing 25 carried by a bracket 26 mounted within the transmission housing.

The rear axle and differential housing 24 is of substantially conventional type including a body portion 27 adapted to inclose the differential mechanism, and also a portion of the transmission mechanism and having an opening in its rear face normally closed by a cap plate 28 secured by bolts 29, this cap plate permitting inspection of the gearing when necessary. The ends of the body portion 27 of the housing are flanged as shown at 30 to receive the mating flanges 31 of the rear axle housing members 32, the rear axle housing members and differential housing being secured by bolts 33 passed through these mating flanges and secured by nuts 34. The differential housing, immediately adjacent the rear axle housings, is provided with radial ball bearings 35 to receive the live, rear axle sections 36 and 37. These rear axle sections are of the full floating type and no further description of the manner of mounting them is therefore believed to be necessary, although it should be noted that one of these sections, in the present instance the section 36, is longer than the other in order to position the differential gearing at one side of the drive or propeller shaft 21. This longer axle section 36 carries a multiple gear, indicated as a whole by the numeral 38, this gear being rotatably mounted upon the axle section adjacent its inner end, a bushing 39 being preferably interposed between the axle section and multiple gear to prevent undue wearing of the parts. That face of the multiple gear 38 directed toward the outer end of the axle section 36 is cut to provide a plurality of series of teeth forming concentric beveled gears 40, 41 and 42. Furthermore, the peripheral edge of the multiple gear 38 is beveled and cut to provide an additional beveled gear 43.

The multiple gear above described is provided upon its opposite face with the differential cage 44, in the form of an annular flange located concentrically with respect to the shaft 36 and terminating in a peripheral extension or flange 45. This cage may, if desired, be formed separately from the body of the gear and secured to it by bolts, the specific details of its construction constituting no part of my present invention. The outer end of the cage is closed by a face plate 46 which is secured to the extension or flange 45 by bolts 47 and nuts 48, this face plate being provided centrally with an opening 49 to receive the axle section 37.

A plurality of stub shafts 50 extend inwardly and radially from the cage 44 and carry small beveled pinions 51, each of which meshes with both of the beveled gears 52 and 53 mounted upon the abutting ends of the live axle sections 36 and 37. The ends of the axle sections are squared as shown at 54 to seat in the squared bores of the beveled gears 52 and 53 to lock the beveled gears against rotation independent of the axle sections and also to prevent movement of either of such gears toward the outer end of its axle section, movement in the opposite direction being prevented by engagement with the beveled pinions 51. For this reason, the multiple gear 47 is locked against movement toward the outer end of its axle section and also against movement toward the other axle section.

Mounted upon the drive shaft 21, within the transmission housing 23, are the low, intermediate and high speed beveled gears 55, 56 and 57, respectively, and the reverse speed beveled gear 58, these gears being adapted to coöperate either directly or indirectly with the beveled gears 42, 41, 40 and 43 of the multiple gear 38. The beveled gear 58 is secured upon the drive shaft, immediately within the transmission housing, by a key 59, or other suitable fastening means. A portion of the drive shaft 21 is squared as shown at 60 to slidably receive the beveled gear 55, which is provided with a squared hub, and immediately at the rear of this squared portion, the shaft is somewhat reduced and rounded as shown at 62 in order that the beveled gear 56 may be idly mounted thereon. Again, immediately at the rear of the rounded portion 62, the shaft is formed with a squared portion 63 to slidably receive a double clutch lock 64 and at the rear of this squared portion with a reduced rounded portion 65 to idly receive the beveled gear 57, this construction permitting the application of all of the gears and of the clutch lock from the rear end of the drive shaft 21.

The bracket 26, previously referred to, includes a base plate 66 having an inwardly directed, longitudinally extending, horizontal guide rib 67 and carriages 68 and 69 are reciprocally mounted upon this rib, being bifurcated to straddle it. The carriage 68 is provided with a bifurcated extension 70 forming a shipper lever for engagement with the locking clutch 64, which is grooved peripherally to receive the arms of such lever. The opposite faces of this locking clutch 64 are recessed at spaced intervals as shown at 71 to lockingly receive lock teeth 72 formed upon the adjacent faces of the gears 56 and 57, this arrangement being such that sliding of the locking clutch in one direction will bring it into locking engagement with the gear 56, while similar movement in the other direction will cause it to lock with the gear 57 of the shaft 21. The carriage 69 is provided in like manner with a shipper lever 73 which engages a thrust collar 74 carried by a sleeve 75 formed upon the forward face of the beveled gear 55. It will be clear that reciprocation of the carriage 69 will cause movement of the gear 55 into and out of mesh with the beveled gear 42 of the multiple gear 38. The bracket, at its forward end, is provided with a lateral extension 76 and a helical spring 77 is connected at one end to this extension and at its other end to the shipper lever 73, this spring normally holding the gear 55 out of mesh with the gear 42. A stud 78 extends inwardly from the bracket 67 and an eccentrically mounted cam 79 is rotatably supported upon this stud in position to engage the shipper lever 73, this cam being so proportioned that in its position of greatest eccentricity, it will force the gear 55 into mesh with the gear 47.

As a means for reciprocating the carriages 68 and 69, I provide a rock shaft 80, the ends of which are journaled in suitable bearings carried by the frame of the vehicle, such bearings not being shown in the drawings, and fixed to this shaft is a hand control lever 81. This hand control lever extends through the H-slot 82 of the lever plate 83, as clearly shown in Fig. 2 of the drawings, as well as in Fig. 1, and in neutral position seats between the U-shaped upper terminals 84 of spring arms 85 and 86 which are swingingly mounted upon the shaft 80 upon either side of the lever 81. These spring arms are so constructed and mounted as to constantly exert pressure against the lever 81 and so lock it in any position to which it may be swung, for which reason the lever, when swung to neutral position, will always be firmly locked in place. A link or operating rod 87 is pivotally connected at one end to the intermediate portion of the spring arm 85 and the other end of this rod is extended through a stuffing box 88 formed in the front wall of the transmission housing and connected to the carriage 68. A similar operating rod 89 is similarly connected to the spring arm 86, extended through the same stuffing box or an adjacent stuffing box and pivotally connected as shown at 90 to the cam 79.

From the foregoing description, it will be apparent that if the lever 81 is engaged with the spring arm 86 and drawn rearwardly to the position shown in Fig. 2, the cam 79 will be turned to force the gear 55 into mesh with the gear 42, which is the low speed position of the transmission gearing. On the other hand, if the lever is swung into engagement with the spring arm 85 and forced to the forward end of the opposite side of the H-slot, the movement of the operating rod 87 will cause the clutch lock 64 to lock the gear 56 to the shaft 21, which is the intermediate speed position of the gears, it of course being understood that as soon as the spring arm 86 is moved forwardly to the cross slot of the plate, the spring 77 will move the gear 55 out of mesh with the gear 42. Again, if the hand lever 81 is swung, while still in engagement with the spring arm 85, to the rear end of the adjacent slot of the plate 83, the carriage 68 will be moved rearwardly to bring the clutch lock 64 into engagement with the gear 67, locking such gear to the shaft 21, under which conditions, the transmission gearing will be set in high speed.

In order to provide for a reverse drive, in the above described transmission, a bracket 91 is mounted within the forward portion of the transmission housing, this bracket forming a bearing for a stub shaft 92 which is so mounted in the bracket that it may be moved inwardly toward the shaft 21, when desired, this stub shaft and the shaft 21 being in the same horizontal plane. Secured upon the inner end of this stub shaft is a multiple gear 93 including beveled gears 94 and 95, the former being adapted to mesh with the gear 58 and the latter with the gear 43 of the multiple gear 38, such meshing engagement being simultaneous. A thrust collar 96 is interposed between the bracket and this multiple gear 93 and helical springs 97 are connected at diametrically opposite points to this thrust collar and to the bracket to normally hold the multiple gear in inactive or outermost position, as shown in Fig. 2. A cam 98 is mounted for turning movement upon a pin 99 in such a manner that its cam face engages against the inner face of the thrust collar 96, this cam being so proportioned that when swung to bring its portion of greatest eccentricity in line with the pin 99 and the thrust collar, the gears 94 and 95 will be forced into mesh with the gears 58 and 43, respectively.

In order to provide means for operating this cam 98 to move the reverse gears in and out of active position, I provide an operating rod 100 having pivotal connection at one end with an eccentric portion of the cam 98 and having its opposite end slotted as at 101 to receive a bolt or other fastening means 102 by means of which such end is secured to the operating rod 89 at a point near the spring arm 86. The engagement of the bolt 102 should be such as to permit free sliding movement of the operating rod 100 with respect to the rod 89 and the slot in which it moves should be so proportioned that the hand lever 81 may be manipulated to swing the spring arm 86 to its rearmost position, as shown in Fig. 2 of the drawings, without in any way moving the operating rod 100. As soon, however, as the hand lever 81 moves into the forward portion of that side of the H-slot adjacent the spring arm 85, the bolt or fastening means 102 will pick up the rod 100 and cause it to turn the cam 98 to force the reverse gears 94 and 95 into mesh with the gears 58 and 43.

As a means for preventing leakage of oil or grease from the transmission housing and also as a means for preventing the entrance of dirt or moisture to the housing, the opening 103 through which the operating rod 100 extends, is closed by a sliding plate 104 having an opening just large enough for the passage of the rod 100, this plate being mounted between guide ribs 105 having inwardly directed plate retaining shoulders 106.

Having thus described the transmission proper, together with its control mechanism, I will now explain the locking mechanism employed to lock the gears in whichever position they may be set. This locking mechanism includes a bracket 107 carried by the supporting shafts 15 and 80 and having a projecting arm 108 upon which is pivotally mounted a locking lever 109, this lever being pivoted intermediate its length upon the arm. The forward end of this locking lever is provided with a cam shaped head 110 so located that its cam face will be engaged by the stem or shank portion 16 of the clutch pedal 17 when the latter is forced ahead to disengage the clutch, this engagement of the locking lever 109 serving to swing its rear end away from a keeper bracket 111. This keeper bracket is formed integrally with a collar 112 which is secured against turning movement upon the shaft 80 by a set bolt 113, a key or other suitable means. The rear end of the locking lever 109 is provided with a squared stud 114 adapted to seat in any one of a plurality of squared sockets 115 formed in the upper portion of the keeper bracket 111, when the locking lever is not engaged by the clutch pedal. Upon engagement of the locking lever by the clutch pedal, the swinging of the rear end of the locking lever of course disengages its stud from whatever socket of the keeper bracket 111 it may be in. A helical spring 116, connected to the locking lever and bracket 107, serves to normally maintain the stud 114 in one of the sockets 115. Three of these sockets 115 are provided in the keeper bracket corresponding to the middle, forward and rear positions of the hand lever 81 for it will be understood that swinging of the hand lever 81 causes corresponding swinging of the keeper bracket 111. It will therefore be seen that whether the gears are in neutral position, first, second, high speed or reverse positions, the stud 114 will, if the clutch is in, seat in one of the sockets 115. This seating of the stud in one of the sockets, of course, locks the shaft 80 against turning movement and consequently locks the rods 87, 89 and 100 against movement, thus locking the gears in whichever position they may be set.

From the foregoing description, taken in connection with the drawings, the operation of my improved transmission gearing will be readily understood and but a brief description is therefore deemed necessary. This operation may best be described by assuming that the transmission mechanism is in neutral position and the clutch in inactive position, that is that the parts are as they would be when the driver approaches the car, the hand lever 81, at that time occupying the cross slot in the plate 83, being engaged by both the spring arms 85 and 86. Under these conditions, the reverse gears 94 and 95 are in the position shown in Fig. 2 of the drawings, the clutch lock 64 is in the position shown in such figure and the gear 55 is out of mesh with the gear 42. The engine may therefore be started in the usual manner without any power being transmitted to the rear axle, the rotating drive shaft 21 in no way affecting the multiple gear 38 as the only gears carried by this drive shaft which mesh with any of the gears of the multiple gear are the beveled gears 56 and 57 which, at this time, are idly mounted upon the shaft 21. With the engine running, the driver throws in the low speed gear by first swinging the clutch pedal forwardly to its full extent, thereby releasing the locking lever 109, after which he forces the hand lever 81 against the spring arm 86 and then draws it rearwardly to the extreme rear end of the H-slot, forcing the rod 89 rearwardly to turn the cam 79 to the position shown in Fig. 2, thus bringing the gear 55 into mesh with the gear 42 of the beveled gear 38. When the lever has been moved to this position, the clutch is released, permitting the spring 116 to swing the locking rod 109 into locking engagement with the keeper bracket 111 to lock the gears in this position.

As soon as sufficient vehicle speed has been attained, the clutch is again thrown out to unlock the gears and the hand lever moved forwardly through the cross slot of the plate 83 to the extreme forward end of the H-slot, carrying the spring arm 85 with it. This movement of the hand lever, first permits the disengagement of the gear 55 from the gear 42 by returning the cam 79 to its original position, and then acts through the operating rod 87 to move the clutch lock 64 into locking engagement with the gear 56. Under these conditions, power transmitted by the shaft 21 turns the gear 56 and consequently the multiple gear 39 and the rear axle sections 36 and 37, this being the intermediate speed of the transmission gearing. The clutch is then of course released to again lock the gears in place. The high speed setting of the transmission is obtained by a repetition of the above operations with the exception that the hand lever 84 is swung in a straight line to the extreme rear end of the H-slot, while still in engagement with the spring arm 85. This movement moves the locking clutch 64 out of engagement with the gear 56 and into locking engagement with the gear 57, the transmission of power being through the gear 57 to the multiple gear 38 and so to the axle sections 36 and 37.

In order to reverse the direction of movement of the vehicle, the clutch is thrown out in the usual manner, and the gear lever, while in engagement with the spring arm 86, is moved to the extreme forward end of the slot, this movement of the lever arm turning the cam 98 to force the multiple gear 93 into simultaneous mesh with the beveled gear 58 and gear 43 of the multiple gear 38. It will of course be understood that the clutch pedal is manipulated in the usual manner both before and after making this change.

One of the chief advantages of my transmission mechanism is the fact that, with the exception of the reverse drive, all speeds are obtainable by a direct drive instead of through the medium of idle gears and that, with the exception of the reverse speed and low speed gears, all driving gears are constantly in mesh with the gears which they drive, these two features doing away with practically all the difficulties ordinarily met with sliding gear transmissions. The entire mechanism is much less complicated than that of power transmissions now in general use, due to the fact that the differential gearing is, in effect, a unit with the rear axle drive and that all the speeds are controlled by the shifting of one control lever.

It will of course be apparent that any number of intermediate speeds may be provided by multiplying the number of beveled gears loosely carried by the drive shaft 21 and correspondingly increasing the number of concentric gears cut upon the multiple gear 38, such changes being well within the skill of an ordinary mechanic. In other words, it will be understood that various changes in details of construction may be made and that the transmission mechanism may be somewhat modified to adapt it for use upon vehicles of different types providing these changes are within the scope of the appended claims, without in the slightest degree departing from the spirit of my invention and that I do not wish in any way to limit myself to the specific details of construction illustrated in the drawings and described in this specification, these drawings being merely a disclosure of a preferred form of my invention.

Having thus described the invention, what is claimed as new is:

1. In a transmission mechanism, a multiple gear, a drive shaft, gears loosely mounted on the drive shaft and each meshing with one of the gears of the multiple gear, an additional gear slidably mounted upon the drive shaft and movable into mesh with one of the gears of the multiple gear, means for selectively locking one of the loosely mounted gears to its shaft or sliding the additional gear into mesh with a gear of the multiple gear, said means being operable by a single lever, and clutch controlled means for locking the lever in position, said clutch controlled means including a shaft upon which the lever is mounted, a keeper bracket carried by the shaft, a locking arm pivoted intermediate its length and terminating at one end in a head engageable by the clutch pedal, said keeper bracket having a plurality of sockets, and a stud formed upon the other end of the locking lever and engageable in one of the other sockets when the clutch is in active position.

2. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, and means for selectively locking any one of the gears in mesh with the first multiple gear to the drive shaft or for moving the slidably mounted gear into mesh with the multiple gear, or for moving the second multiple gear into engagement with the fixed gear and first multiple gear.

3. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, and means for selectively locking any one of the gears in mesh with the first multiple gear to the drive shaft or for moving the slidably mounted gear into mesh with the multiple gear, or for moving the second multiple gear into engagement with the fixed gear and first multiple gear, said means being operable by a single hand lever.

4. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, and means for selectively locking any one of the gears in mesh with the first multiple gear to the drive shaft or for moving the slidably mounted gear into mesh with the multiple gear, or for moving the second multiple gear into engagement with the fixed gear and first multiple gear, said means being operable by a single hand lever, and means for locking the hand lever in any of its various positions.

5. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, and means for selectively locking any one of the gears in mesh with the first multiple gear to the drive shaft or for moving the slidably mounted gear into mesh with the multiple gear, or for moving the second multiple gear into engagement with the fixed gear and first multiple gear, said means being operable by a single hand lever, means for locking the hand lever in any of its various positions, and means for automatically returning the sliding gear and second multiple gear to normal position when released.

6. In a transmission mechanism, a beveled gear, a drive shaft, a second beveled gear carried by the drive shaft, an idler shaft, a multiple gear mounted on the idler shaft, and means for reciprocating the idler shaft to bring one of its gears into mesh with the first beveled gear and its other gear into mesh with the beveled gear of the drive shaft.

7. In a transmission mechanism, a beveled gear, a drive shaft, a second beveled gear carried by the drive shaft, an idler shaft, a multiple gear mounted on the idler shaft, and means for reciprocating the idler shaft to bring one of its gears into mesh with the first beveled gear and its other gear into mesh with the beveled gear of the drive shaft, said means including a revolubly mounted cam, a hand lever, and operative connection between the hand lever and cam.

8. In a transmission mechanism, a beveled gear, a drive shaft, a second beveled gear carried by the drive shaft, an idler shaft, a multiple gear mounted on the idler shaft, and means for reciprocating the idler shaft to bring one of its gears into mesh with the first beveled gear and its other gear into mesh with the beveled gear of the drive shaft, said means including a revolubly mounted cam, a hand lever, operative connection between the hand lever and cam, and springs for normally holding the idler shaft in inactive position.

9. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, means for selectively locking any one of the gears in mesh with the first multiple gear to the drive shaft, means for moving the slidably mounted gear into mesh with the multiple gear, means for moving the second multiple gear into engagement with the fixed gear and first multiple gear, a hand lever swingingly-mounted, connecting rods between the hand lever and the locking means and between the hand lever and the means for moving the sliding gear, and a connecting rod operatively joining said latter rod and the means for moving the second multiple gear.

10. In a transmission mechanism, a multiple gear, a drive shaft, a plurality of beveled gears loosely mounted on the drive shaft and constantly meshing with certain gears of the multiple gear, an additional gear slidably mounted on the drive shaft and movable into mesh with one of the gears of the multiple gear, a beveled gear fixed upon the drive shaft, a stub shaft, a second multiple gear carried by the stub shaft and movable to bring one of its gears into mesh with one of the gears of the first multiple gear and its other gear into mesh with that gear fixed on the drive shaft, means for selectively locking any one of the gears in mesh with the first multiple gear to the drive shaft, means for moving the slidably mounted gear into mesh with the multiple gear, means for moving the second multiple gear into engagement with the fixed gear and first multiple gear, a hand lever swingingly mounted, connecting rods between the hand lever and the locking means and between the hand lever and the means for moving the sliding gear, and a connecting rod operatively joining said latter rod and the means for moving the second multiple gear, the connection between such latter connecting rods permitting slight independent movement of the former with respect to the latter.

11. In a transmission mechanism, a beveled driven gear, a drive shaft, a beveled pinion secured to the drive shaft, a reciprocally mounted idler shaft, a multiple gear carried by the idler shaft and movable upon reciprocation of the shaft to bring one of its gears into mesh with the driven gear and the other with the pinion, and means for reciprocating the idler shaft.

12. In a transmission mechanism, a beveled driven gear, a drive shaft, a beveled pinion secured to the drive shaft, a reciprocally mounted idler shaft, a multiple gear carried by the idler shaft and movable upon reciprocation of the shaft to bring one of its gears into mesh with the driven gear and the other with the pinion, and means for reciprocating the idler shaft, said means including springs normally holding the idler shaft in retracted position, and a rotatable cam adapted, when turned in one position, to move the idler shaft to advance position.

13. In a transmission mechanism, a multiple gear, a drive shaft, beveled pinions carried by the drive shaft and meshing with certain of the gears of the multiple gear, a beveled pinion carried by the drive shaft and movable into mesh with another gear of the multiple gear, a further beveled pinion mounted upon the drive shaft, a second multiple gear movable to bring one of its gears into mesh with one of the beveled gears of the first multiple gear and its other gear into mesh with the last named beveled gear on the drive shaft, means for shifting the various movable gears, control rods connected to such means, and a single lever movable to selectively engage and actuate the control rods.

14. In a transmission mechanism, a multiple gear, a drive shaft, beveled pinions carried by the drive shaft and meshing with certain of the gears of the multiple gear, a beveled pinion carried by the drive shaft and movable into mesh with another gear of the multiple gear, a further beveled pinion mounted upon the drive shaft, a second multiple gear movable to bring one of its gears into mesh with one of the beveled gears of the first multiple gear and its other gear into mesh with the last named beveled gear on the drive shaft, means for shifting the various movable gears, control rods connected to such means, a single lever movable to selectively engage and actuate the control rods, a shaft to which such lever is secured, and clutch operated means for locking the shaft.

15. In a transmission mechanism, a multiple gear, a drive shaft, beveled pinions carried by the drive shaft and meshing with certain of the gears of the multiple gear, a beveled pinion carried by the drive shaft and movable into mesh with another gear of the multiple gear, a further beveled pinion mounted upon the drive shaft, a second multiple gear movable to bring one of its gears into mesh with one of the beveled gears of the first multiple gear and its other gear into mesh with the last named beveled gear on the drive shaft, means for shifting the various multiple gears, control the control rods, a shaft to which such lever movable to selectively engage and actuate the control rods, a shaft to which such lever is secured, and clutch operated means for locking the shaft, said means including a bracket fixed to the shaft and having spaced sockets, a cam lever pivotally mounted and having a pin engageable in the sockets, said cam lever being engageable by the clutch pedal to swing the pin out of such engagement, and a spring normally holding the cam lever with its pin in engagement with one of the sockets.

In testimony whereof I affix my signature in presence of two witnesses.

EDGAR J. WENDLE. [L. S.]

Witnesses:
GILBERT THOMAS,
IRVIN CLARK.

Copies of this patent may be obtained for five cents each, by addressing the "Commissioner of Patents, Washington, D. C."